(12) United States Patent
Gremaud

(10) Patent No.: US 6,230,816 B1
(45) Date of Patent: May 15, 2001

(54) COMBINED SUPPORT DEVICE FOR TORCH AND EXTINGUISHER

(75) Inventor: Armand Gremaud, Fontainemelon (CH)

(73) Assignee: Etablissement Cantonal d'Assurance (CH)

(*) Notice: Subject to any disclaimer, the term of this patent is extended or adjusted under 35 U.S.C. 154(b) by 0 days.

(21) Appl. No.: 09/424,692
(22) PCT Filed: May 12, 1998
(86) PCT No.: PCT/CH98/00194
  § 371 Date: Jan. 26, 2000
  § 102(e) Date: Jan. 26, 2000
(87) PCT Pub. No.: WO98/53947
  PCT Pub. Date: Dec. 3, 1998

(30) Foreign Application Priority Data

May 26, 1997 (FR) .................................................. 97 06562

(51) Int. Cl.[7] .................................................. A62C 29/00
(52) U.S. Cl. .............................. 169/51; 169/54; 248/117.1
(58) Field of Search ........ 106/54, 51; 248/117.1–117.5, 248/117.6–117.7; 220/668, 485, 88.1

(56) References Cited

U.S. PATENT DOCUMENTS

| 2,355,883 | * | 8/1944 | Mathews | 248/117.1 |
| 2,761,586 | * | 9/1956 | Hubbell | 169/54 |
| 3,254,868 | * | 6/1966 | Quaas et al. | 248/117.1 |
| 3,945,440 | * | 3/1976 | Bohme | 169/54 |
| 4,065,084 | * | 12/1977 | Wiener | 248/117.1 |
| 4,762,979 | * | 8/1988 | Geoffroi | 248/117.1 |

FOREIGN PATENT DOCUMENTS

| 9116056 | * | 2/1992 | (DE) . |
| 9303224 | * | 3/1993 | (DE) . |
| 9318323 | * | 3/1994 | (DE) . |

* cited by examiner

Primary Examiner—David A. Scherbel
(74) Attorney, Agent, or Firm—Baker Botts L.L.P.

(57) ABSTRACT

The invention concerns a combined support, in particular for an extinguisher, comprising a frame (11), a housing (12) for said extinguisher, handle (13) integral with said frame, catching surface (14) and legs (114, 152) for resting on a plane surface. The extinguisher housing is formed by several concentric rings (121 to 124), the top ring (121) comprising an open sector (8). In order to constitute a support for a torch nozzle (20) the device comprises an additional ring (17) fixed under the top ring (121), a V-shaped notch provided on said additional ring top edge and an inverted V-shaped notch provided on the top ring (121) bottom edge opposite the V-shaped notch. Said device improves safety conditions when a torch is being used on a work site.

11 Claims, 3 Drawing Sheets

COMBINED SUPPORT DEVICE FOR TORCH AND EXTINGUISHER

FIELD AND BACKGROUND OF THE INVENTION

The present invention concerns a combined support device, in particular for an extinguisher, including a frame, a housing for said extinguisher, prehensile means integral with said frame, catching means and means for resting on a plane surface.

In numerous industrial sectors, such as the tinplate industry, plumbing and heating installations, it is necessary to use a torch for various work, such as welding, soldering, oxygen cutting and flame descaling. This work is carried out with a naked flame and can thus involve a significant risk of fire by inflammation of the combustible materials situated in immediate proximity to the torch flame. Moreover, since the torch flame can reach temperatures higher than 3000° C., fires are also liable to be caused indirectly, in particular by sparks or drops of melted metal or the prolonged action of heat radiation, even outside the area of formation of the flame.

Added to these risks is that created by the torch itself when it is not being used. Indeed, operations performed with a torch require frequent interruptions during which the flame is not extinguished. If the torch is then placed carelessly on the floor or on any object acting as a support, it can cause a fire.

This is why it is necessary for the user of the torch to have available, at the place where work is being performed, an extinguisher which he can easily move and a suitable support to place the torch on safely when he is not using it.

OBJECTS AND SUMMARY OF THE INVENTION

The present invention proposes to provide a solution to this safety problem by providing a combined support device as defined in the preamble and characterised in that it further includes means for supporting the torch nozzle and means for insulating the flame of said torch from the environment in which it is situated.

According to the preferred embodiment of the device, the housing for the extinguisher includes several concentric rings and the frame includes two vertical struts to which said rings are fixed at regular intervals.

Preferably, the prehensile means of the device include a handle integral with the vertical struts of the frame and two arms provided with a free bent section at one of the ends thereof. These free sections form the catching means of the device.

The means for placing the device on a plane surface include three legs, two of said legs being formed by the ends of the vertical struts of the frame, and the third being fixed on the rings of the housing at a point which is equidistant from said vertical struts.

In an advantageous manner, the top ring of the housing includes an open sector and the means for supporting torch nozzle include:

an additional ring fixed to the vertical struts of the frame, under the top ring, a V-shaped notch arranged on the top edge of said additional ring, and an inverted V-shaped notch arranged on the bottom edge of said ring opposite the V-shaped notch, said means allowing the torch nozzle to be supported and immobilised when the device is in a vertical position.

In another embodiment, the torch nozzle support means include:

an intermediate element fixed to the vertical struts of the frame between the prehensile means and the housing, and a groove arranged in said intermediate element for accommodating, guiding and preventing the backward movement of the torch nozzle when the device is in a horizontal position.

Preferably, the means for insulating the torch flame include:

a curved metal plate arranged along the housing over the section thereof comprised between the two vertical struts, and a layer of insulating material placed in the space defined between said plate and said housing.

BRIEF DESCRIPTION OF THE DRAWINGS

The present invention will be better understood with reference to the description of a preferred embodiment and the annexed drawings, in which.

DESCRIPTION OF A PREFERRED EMBODIMENT

Figures 1, 1A:
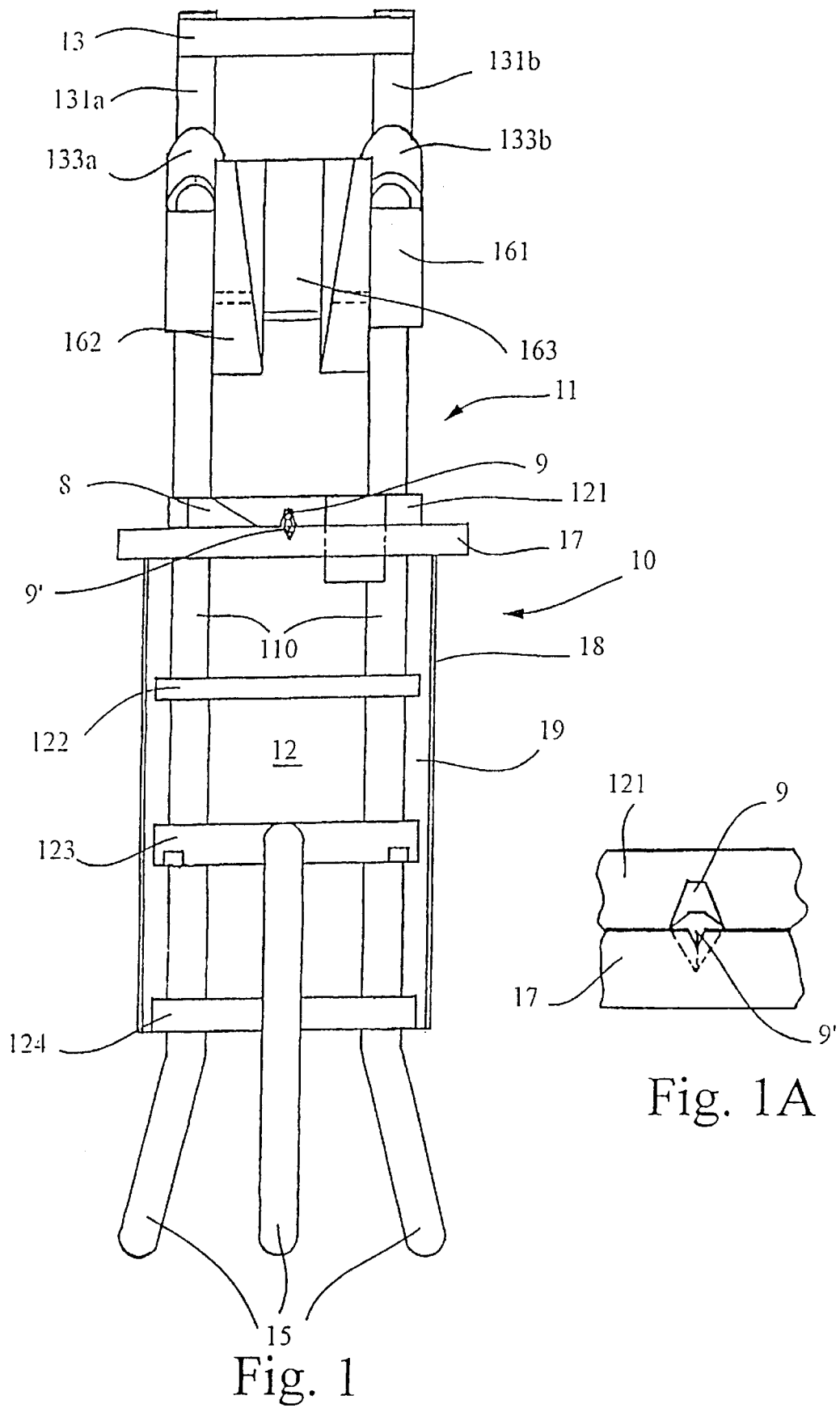
FIGS. 1 and 1A show a front view of the device according to the invention in a vertical position, FIG. 1A being a detailed view of a portion of FIG. 1.
Figure 2:
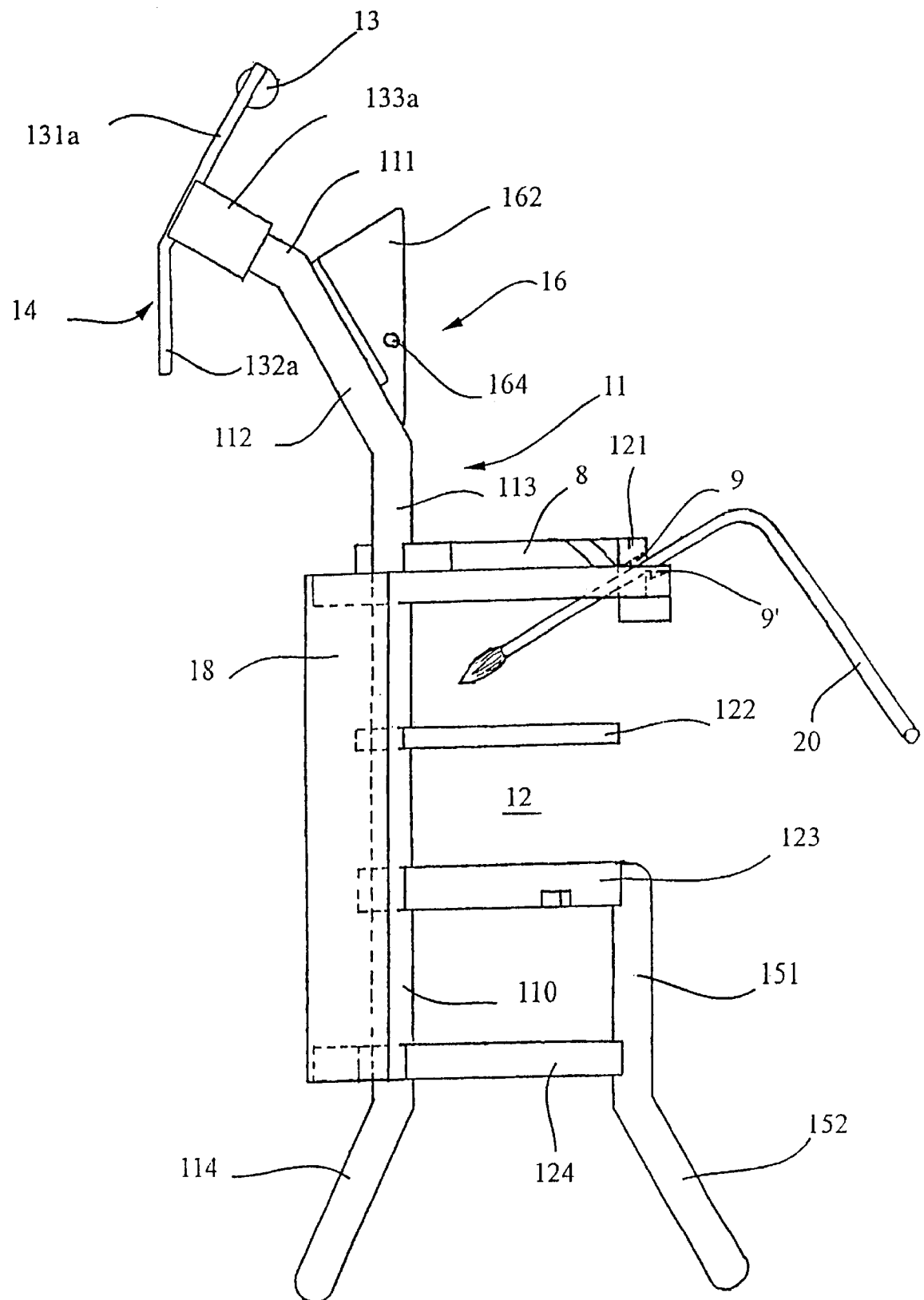
FIG. 2 shows a lateral view of the same device.

With reference to FIGS. 1, 1A and 2, support device 10, shown in a vertical position, includes a frame 11, a housing 12 intended to accommodate an extinguisher of the type approved by the authority concerned, prehensile means in the form of a handle 13 allowing it to be transported easily, catching means 14 allowing it to be attached for example to a pipe or to laths situated at the place where the work is performed, and legs 15 to enable it to be placed on the ground or on any other plane surface. Housing 12 and handle 13 are integral with frame 11.

Frame 11 is formed of two symmetrical cylindrical vertical struts 110 made in a single piece, for example of steel, and including four sections respectively 111, 112, 113 and 114. Central section 113 is rectilinear and extended upwards by section 112 forming an angle of approximately 30° with respect to section 113. Section 112 is itself extended by end section 111 which also forms an angle of approximately 30° with respect to section 112. Section 114 forming the lower end of section 113 forms an angle of approximately 30° with section 113 but is also situated in a vertical plane forming an angle of approximately 30° with the vertical plane containing sections 111, 112 and 113.

Housing 12 intended to accommodate the extinguisher, a cage defined by four concentric rings 121, 122, 123 and 124 all having the same outer diameter. Rings 121 to 123 have an identical inner diameter, but ring 124 has a smaller diameter than the diameter of the three other rings in order to form the bottom of the housing. Top ring 121 includes laterally an open sector 8 over an angle of approximately 90°, as well as a substantially V-shaped notch 9, on its bottom edge, the function of which will be defined hereinafter.

Each ring of the cage is provided, on the outer perimeter thereof, with two cylindrical bevels or chamfers spaced at approximately 90° and each arranged to co-operate with one of vertical struts 110 in order to allow the rings to be fixed to the vertical struts at regular intervals and by known means.

The prehensile means of device 10 are formed of a cylindrical handle 13 each end of which includes a plane cut away portion arranged to co-operate with one end of an arm 131a, 131b respectively, of rectangular cross-section, by being screwed thereto. These arms are further provided at their other end with a bent free section 132a, 132b respectively, forming an angle of approximately 30° with the axis of said arms, these free sections forming means 14 for catching the device on a lath or a tube situated in proximity to the place where the workman is welding. The rectilinear sections of these two arms are further attached by being screwed to two cylindrical sockets 133a and 133b. The length of handle 13 and the inner diameter of the sockets are such that the assembly formed by handle 13 attached to the two arms 131a and 131b and the two sockets fit into sections 111 of vertical struts 110.

Legs 15 of the device are three in number, two of said legs being formed by the two sections 114 of vertical struts 110. The third leg includes a rectilinear portion 151 allowing it to be fixed to rings 123 and 124 of housing 12 at a point which is equidistant from vertical struts 110. This rectilinear section 151 is extended by a section 152 identical to sections 114 forming the two other legs.

Device 10 further includes an intermediate ring 16 attached to sections 113 of vertical struts 110. This element 16 is formed of a plate 161, fixed via screws to sections 113, onto which is screwed a support of triangular cross-section 162 provided with a dovetailed central groove 163. This support 162 is, moreover, provided with a horizontal through bore 164 intended to accommodate a pin (not shown).

The combined device includes, moreover, an outer ring 17 which is also concentric with the rings of housing 12 but whose inner diameter is such that, when it is fixed to vertical struts 110, the latter are trapped between the rings defining extinguisher housing 12 and ring 17. This latter is fixed to vertical struts 110 directly under ring 121 and acts as support for a curved protective plate 18 covering the peripheral section of ring 17 defined between the two vertical struts 110. Plate 18 extends over the entire length of housing 10. It is made of steel and has a thickness of approximately 1 mm. A layer of mineral wool 19 is inserted between housing 12 and plate 18 to which it is fixed in a removable manner by screws which are not shown. Ring 17 is, further, provided on its outer edge with a substantially inverted V-shaped notch 9', opposite notch 9 of ring 121 of housing 12.

The principle of use of the combined device according to the invention is as follows. When it is used to act as support for an extinguisher, the latter is introduced vertically into housing 12, its release handle engaging in groove 163 of element 16 in order to prevent it from rotating. When it is being transported, it is held in its housing by a through pin housed in bore 164. When the workman is at his place of work and he is using a torch, he must have the extinguisher within reach and out of its support. At this moment, the device can then be used as a support for the torch during interruptions during which said torch is not extinguished.

If, as shown in FIG. 2, it is an oxy-acetylene torch, nozzle 20 takes the form of a long bent tube of small diameter and support device 10 is then used vertically. Nozzle 20 is introduced between ring 17 and ring 121 of housing 12 via opening 8 of ring 121. It is then placed in notch 9' of ring 17 and held in a position inclined downwards by the corresponding notch 9 of ring 121. In this position, the flame is directed against mineral wool layer 19 and is thus insulated from the environment in which the torch is situated.

Figure 3:
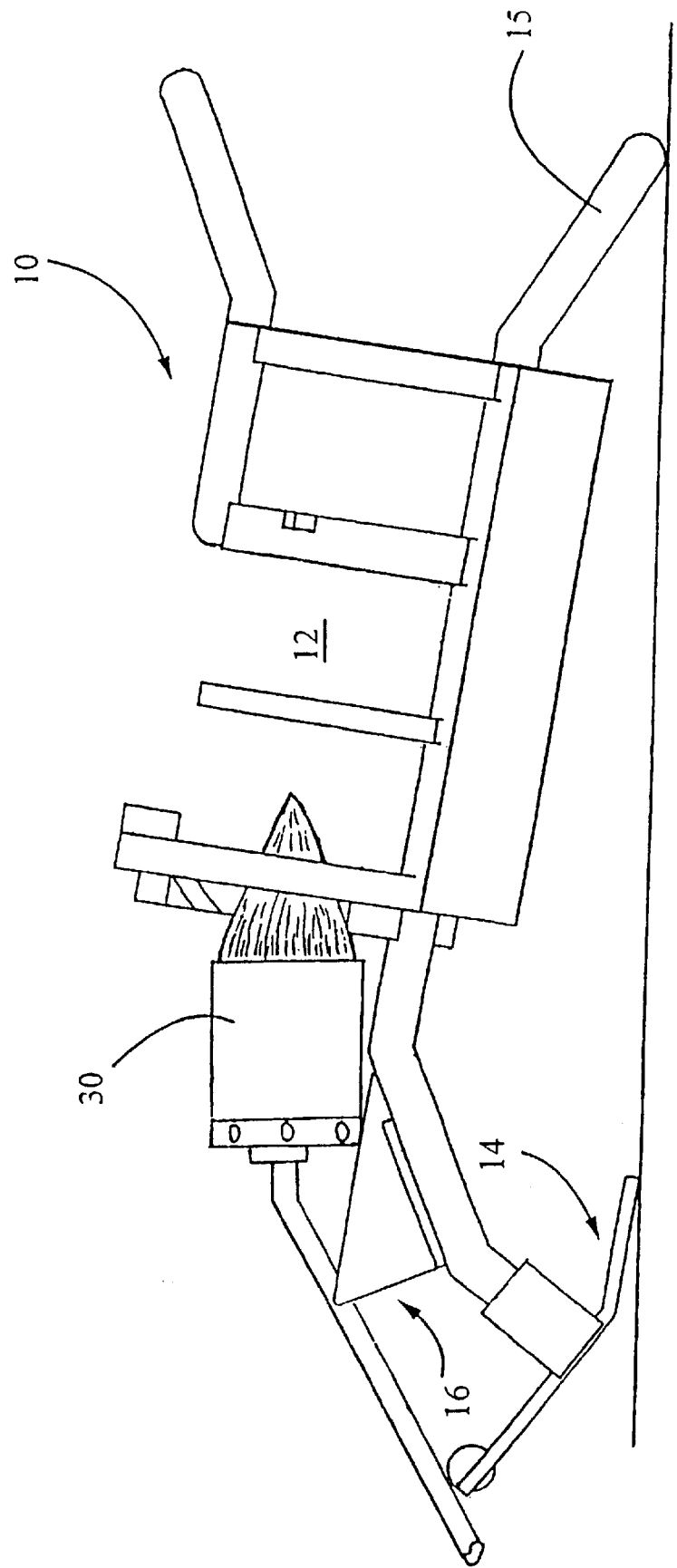
FIG. 3 shows the device used in a horizontal position.

If, as shown in FIG. 3, it is a propane-butane torch, nozzle 30 takes the form of a shorter tube having a diameter of the order of several centimeters and the support device is then used horizontally. The device is laid down and rests on the ground by the two legs 15 formed by the ends of vertical struts 110 and catching means 14. Nozzle 30 is then introduced horizontally into the device via the top of housing 12 and is placed in groove 163 of element 16. The flame is thus situated above mineral wool layer 19 which insulates it from the immediate environment.

This combined device thus allows all the safety regulations required during use of a torch on a work site to be met.

The present invention is not limited to the described embodiment but may undergo various modifications which are obvious to those skilled in the art.

What is claimed is:

1. A combined support device comprising: a frame, a housing for an extinguisher in mechanical communication with the frame, a handle means integral with said frame, a catching means in mechanical communication with said frame, a means for resting on a plane surface in mechanical communication with the frame, a means for supporting a torch nozzle and a means for insulating a flame of said torch from an environment in which it is situated.

2. The device of claim 1, wherein the housing comprises several concentric rings.

3. The device of claim 2, wherein the frame comprises two vertical struts to which said rings are fixed at regular intervals.

4. The device of claim 3, wherein the handle means comprises a handle integral with said vertical struts.

5. The device of claim 4, wherein the handle means comprises two arms provided, at one of their ends, with a free bent section.

6. The device of claim 5, wherein the free sections of the arms are arranged to form the catching means of said device.

7. The device of claim 3, wherein the means for resting on a plane surface comprises three legs, two of said legs being formed by the ends of the vertical struts, the third leg being fixed to the rings of said housing at a point which is equidistant from said vertical struts.

8. The device of claim 3, wherein a top ring of said several concentric rings of the housing comprises an open sector and wherein the means for supporting a torch nozzle comprises:

an additional ring fixed to the vertical struts under the top ring, a V-shaped notch arranged on a top edge of said additional ring, and an inverted V-shaped notch arranged on a bottom edge of said top ring opposite the V-shaped notch, wherein said means for supporting a torch nozzle allows the torch nozzle to be supported and immobilised when the device is in a vertical position.

9. The device of claim 3, wherein the means for supporting the torch nozzle comprises:

an intermediate element fixed to the vertical struts between said prehensile means and said housing, and a groove arranged in said intermediate element for accommodating, guiding and preventing the backward movement of the torch nozzle when the device is in a horizontal position.

10. The device of claim 3, wherein the means for insulating the torch flame comprises:

a curved metal plate arranged along said housing over a section thereof comprised between the two vertical struts, and a layer of insulating material placed in a space defined between said plate and said housing.

11. The device of claim 1, wherein the device is an extinguisher.

* * * * *